United States Patent [19]
Doyle

[11] Patent Number: 5,717,716
[45] Date of Patent: Feb. 10, 1998

[54] QUASI-ADAPTIVE ANALOG EQUALIZATION METHOD AND APPARATUS

[75] Inventor: James T. Doyle, Chandler, Ariz.

[73] Assignee: Intel Corporation, Santa Clara, Calif.

[21] Appl. No.: 414,618

[22] Filed: Mar. 31, 1995

[51] Int. Cl.$^6$ .................................................. H03H 7/30
[52] U.S. Cl. .................................................. 375/232
[58] Field of Search ................................ 375/229, 230, 375/232, 346, 348, 350; 364/724.2; 333/18, 28 R

[56] References Cited

U.S. PATENT DOCUMENTS 4,488,126  12/1984  Suthers .............................. 375/229 X
4,663,583   5/1987  Ludwick et al. .................... 375/230

*Primary Examiner*—Stephen Chin
*Assistant Examiner*—Kevin Kim
*Attorney, Agent, or Firm*—Blakely, Sokoloff, Taylor & Zafman

[57] ABSTRACT

A quasi-adaptive analog equalization method and apparatus for compensating for phase and amplitude degradation of data transmitted over a transmission medium. One embodiment of the present invention includes a first quasi-adaptive equalizer that receives a first set of data, in order to adjust the amplitude and phase of the first set of data to produce a second set of data. The first quasi-adaptive equalizer then supplies the second set of data to a second quasi-adaptive equalizer, which adjusts the amplitude and phase of the second set of data to produce an equalized set of data. As both the first and the second equalizers are quasi-adaptive equalizers, they base the amount of their phase and amplitude compensation on the amplitude of the symbol pulses that the equalization network receives.

16 Claims, 12 Drawing Sheets

QUASI-ADAPTIVE ANALOG EQUALIZATION METHOD AND APPARATUS

BACKGROUND OF THE INVENTION

1. Field of the Invention

The present invention relates to the field of data communication, and particularly to a quasi-adaptive analog equalization method and apparatus.

2. Art Background

Communication networks are commonly used to interconnect a variety of computing devices. These networks typically include a number of communication nodes that transmit data from their encoders to their decoders across a variety of transmission media. For example, a number of communication protocols (such as the Ethernet protocol and the Token Ring protocol) utilize twisted pair cables (such as category three unshielded twisted pair cables (UTDCAT3)) to transmit data from their encoders to their decoders.

The transmission of data across a transmission medium causes the data's phase and amplitude to be distorted. Amplitude and phase distortions in turn can cause decoders to erroneously predict the value of the received data. For example, phase distortions can cause correlated jitters (i.e., can cause phase-related abrupt spurious, variations in the phase of successive received data symbol pulses with respect to the phase of a reference clock), which reduce the probability that demodulators of the decoders will accurately predict the value of the received data by preventing the demodulators from sampling the received signals at the center of the data symbols pulses.

Amplitude and phase distortions are dependent on the length of the transmission medium and on the transmitted information's frequency component. More specifically, as the length of the transmission medium increases so does the degree of the phase and amplitude degradation. Amplitude and phase distortions also increase proportionately with the transmission medium's impedance, which increases as the frequency of the transmitted signal increases. For example, the amplitude of data transmitted across a one hundred meter UTDCAT3 twisted pair cable degrades by 10 decibels at 10 MHz and thereafter degrades at approximately 3 decibels per frequency-octave. FIG. 1 demonstrates the transmitted data's amplitude degradation as a function of the length of the transmission medium and the frequency of the transmitted signals.

Numerous prior art equalizers have been developed to provide both (1) DC compensation (i.e., frequency independent compensation) to offset phase and amplitude distortions due to the length of the transmission medium, and (2) AC compensation (i.e., frequency dependent compensation) to offset phase and amplitude distortions due to the transmission medium's impedance, which is dependent on the frequency of the transmitted signals. For example, prior art equalizers include analog discrete equalizers and digital equalizers (such as automatic line build-out, finite impulse response (FIR), and infinite impulse response (IIR) equalizers). Digital equalizers require memory circuitry, high speed digital signal processing circuitry, and state of the art crystal oscillators. In other words, digital equalizers require complicated and expensive electronic circuitry.

On the other hand, analog equalizers present a cost-effective solution to the equalization problem. FIG. 2 presents one prior art analog discrete equalizer network. Prior art equalizer network 200 includes equalizers 205 and 210, which are differential amplifiers that have single pole compensation networks 220 and 225. Equalizer network 200 is designed to operate in communication networks that utilize the 4 and 16 MBit Token Ring protocols. Consequently, equalizer network 200 includes (1) equalizer 205 for operating with the 4 MBit Token Ring protocol (i.e., equalizer 205 is designed to provide phase and amplitude compensation in the 1–6 MHz frequency range of the transmitted data), (2) equalizer 210 for operating with the 16 MBit Token Ring protocol (i.e., equalizer 210 is designed to provide phase and amplitude compensation in the 4–18 MHz frequency range of the transmitted data), and (3) select mechanism 215 for enabling a user to select between equalizers 205 and 210.

Both equalizers 205 and 210 are quasi-adaptive equalizers which base the amount of their phase and amplitude compensation on the amplitude of the transmitted data. In other words, these equalizers quasi-adaptively adjust their compensation based on the amplitude of the transmitted data, which is dependent on the length of the transmission medium. Thus, these quasi-adaptive equalizers (1) operate in a linear mode to provide significant compensation when their input transistors (Q230A, Q230B) are in their active region, (2) operate in a compression mode (i.e., a nonlinear mode) to provide less compensation when their input transistors are in their saturation region near their active region, and (3) operate in a cut-off mode to provide virtually no compensation when their input transistors are in their saturation region far from their active region.

Moreover, these single pole equalizers overcompensate for phase and amplitude AC distortions (i.e., distortions due to the varying impedance of the transmission medium when they operate in their linear mode). For example, when equalizers 205 and 210 operate in their linear region, they provide an AC amplitude compensation of 6 dB/frequency-octave, which in turn overcompensates for the 3 dB/frequency-octave AC amplitude degradation due to transmission. Consequently, in order to provide the necessary phase and amplitude compensation in the frequency range of interest (e.g., in order to provide an AC amplitude compensation of 3 dB/frequency-octave in the frequency range of interest), these equalizers are designed to operate in their compression mode when receiving signals corresponding to a single average twisted pair cable length of fifty meters. In other words, the utility of prior art equalizers 205 and 210 is maximized by designing their peak performance to occur at the average twisted pair cable length of fifty meters (i.e., by tuning these equalizers to operate in their compression mode for the average twisted pair cable length of fifty meters).

More specifically, when the input signal Vin is small, the input transistors of equalizers 205 and 210 operate in their linear region, and their simplified small signal transfer function is approximately equal to the following:

$$G(j\omega) = \frac{R_{220} * g_m}{2} \left( \frac{1}{1 + g_m * R_{240}} \right) \left( \frac{j\omega + a}{j\omega b} \right),$$

$$\text{where } a = \frac{1}{C_{260} * R_{250}} \text{ and } b = \frac{1}{C_{260} * R_{250}} \left( 1 = \frac{R_{250}}{R_{240}} \right).$$

By choosing R240, R250, and C260 appropriately, equalizers 205 and 210 can be designed to provide phase and amplitude compensation over any frequency range of interest. In addition, in order to improve their phase and amplitude compensation in the frequency range of interest, these equalizers are biased such that they operate in their compression mode when the amplitude of the received symbol pulses reaches a specified magnitude corresponding to the specified average cable length of fifty meters (i.e., when the amplitude of the received symbol pulses reaches the amplitude of a received symbol pulse that is transmitted over a fifty meter twisted pair cable). For example, as shown by the amplitude compensation plot set forth in FIG. 3, for the average cable length of fifty meters, these equalizers provide an AC amplitude compensation of 3 dB/frequency-octave compensation in the frequency range of interest, because they are biased such that they operate in their compression mode when they receive input pulses whose amplitude equals the amplitude of pulses transmitted across a fifty meter twisted pair cable.

Unfortunately, this prior art analog equalizer network does not optimally compensate for phase and amplitude degradation over the standard 0–100 meter twisted pair cable length range, because its equalizers are designed around only a single transmission line length in the 0–100 meter range (i.e., are designed around only the average twisted pair cable length of fifty meters). Thus, as the transmission line length increases past fifty meters, this prior art equalizer network's phase and amplitude compensation deteriorates. In addition, this prior art implementation cannot provide adequate compensation when twisted pair cables longer than one hundred meters are used. Finally, this prior art analog equalizer network does not optimally utilize its circuitry (1) to optimize the performance of the equalizers in the 0–100 meter twisted-pair cable length range, and (2) to work with twisted pair cables that are longer than 100 meters.

SUMMARY OF THE INVENTION

The present invention provides a quasi-adaptive analog equalization method and apparatus for compensating for phase and amplitude degradation of data transmitted over a transmission medium. One embodiment of the present invention includes a first quasi-adaptive equalizer that receives a first set of data, in order to adjust the amplitude and phase of the first set of data to produce a second set of data. The first quasi-adaptive equalizer then supplies the second set of data to a second quasi-adaptive equalizer, which adjusts the amplitude and phase of the second set of data to produce an equalized set of data. As both the first and the second equalizers are quasi-adaptive equalizers, they base the amount of their phase and amplitude compensation on the amplitude of the symbol pulses that the equalization network receives.

Another embodiment of the present invention includes two cascaded quasi-adaptive equalizers. The first quasi-adaptive equalizer receives a first set of data in order to adjust the amplitude and phase of this set of data to produce a second set of data. This first quasi-adaptive equalizer operates in a cutoff mode to provide virtually no compensation when the amplitude of the first set of data is below a first predetermined amplitude corresponding to a first predetermined length of the transmission medium. In other words, this first quasi-adaptive equalizer uses a compression based biasing design, that causes this equalizer to operate in compression to provide the necessary phase and amplitude compensation when the amplitude of the first set of data reaches a first predetermined amplitude corresponding to the first predetermined length of the transmission medium.

The second quasi-adaptive equalizer then receives the second set of data, in order to adjust the amplitude and phase of this set of data to produce an equalized set of data. This second quasi-adaptive equalizer operates in its cutoff mode to provide virtually no phase and amplitude compensation unless the amplitude of the first set of data is below a second predetermined amplitude corresponding to a second predetermined length of the transmission medium. More specifically, this second equalizer also uses a compression based biasing design, which causes this equalizer to operate in its compression mode when the amplitude of the first set of data is below the second predetermined amplitude corresponding to the second predetermined length of the transmission medium.

BRIEF DESCRIPTION OF THE DRAWINGS

The objects, features, and advantages of the present invention will be apparent from the following detailed description, in which.

DETAILED DESCRIPTION OF THE INVENTION

In the following description, for purpose of explanation, numerous details (such as the specific communication network architectures of FIGS. 4 and 9) are set forth in order to provide a thorough understanding of the present invention. However, it will be understood by one skilled in the art that these specific details are not required in order to practice the present invention. In other instances, well-known electrical structures and circuits are shown in block diagram form in order not to obscure the present invention unnecessarily.

Figure 1:
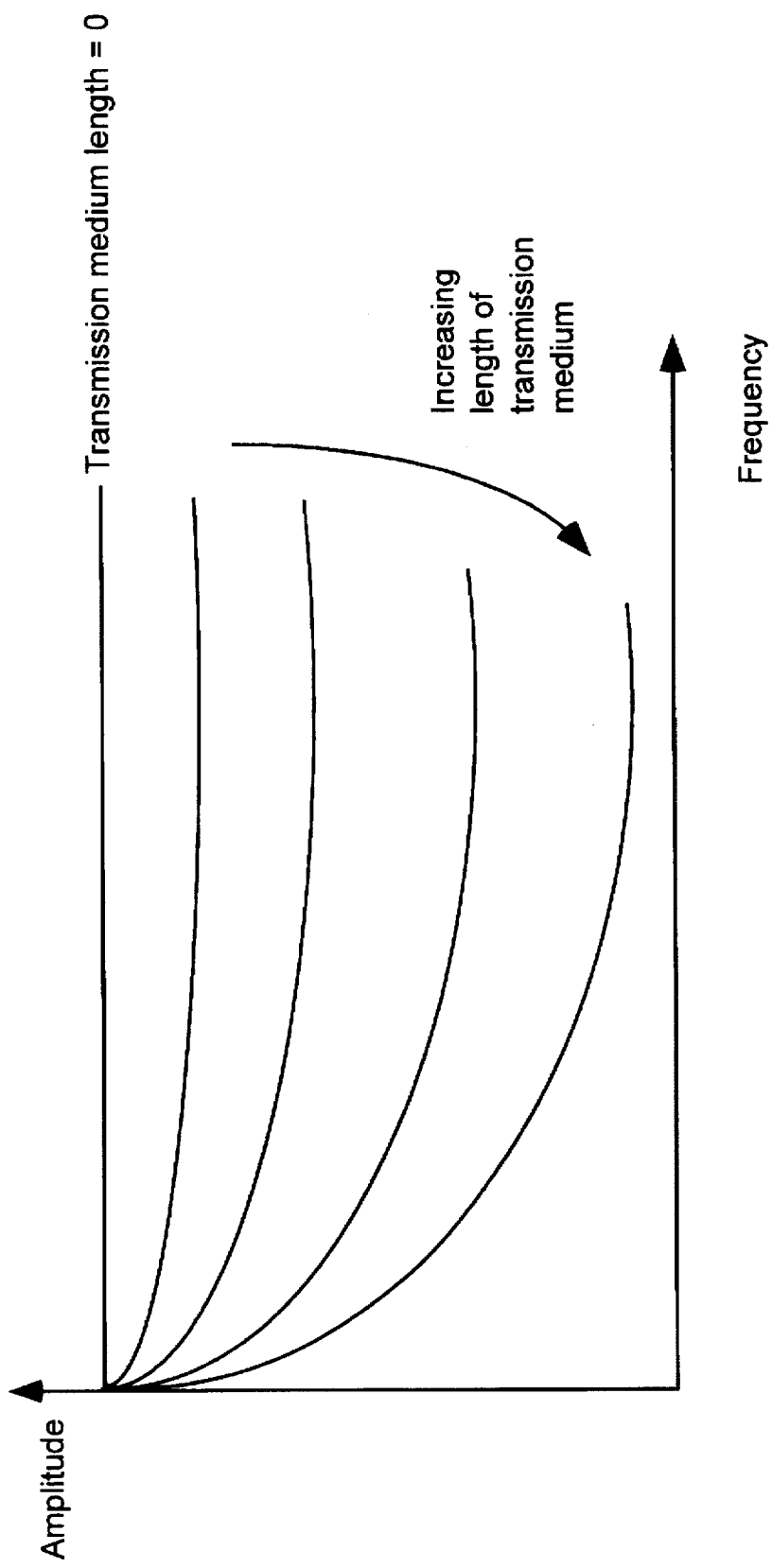
FIG. 1 presents a graph demonstrating the transmitted data's amplitude degradation as a function of the length of the transmission medium and the frequency of the transmitted signals.
Figure 2:
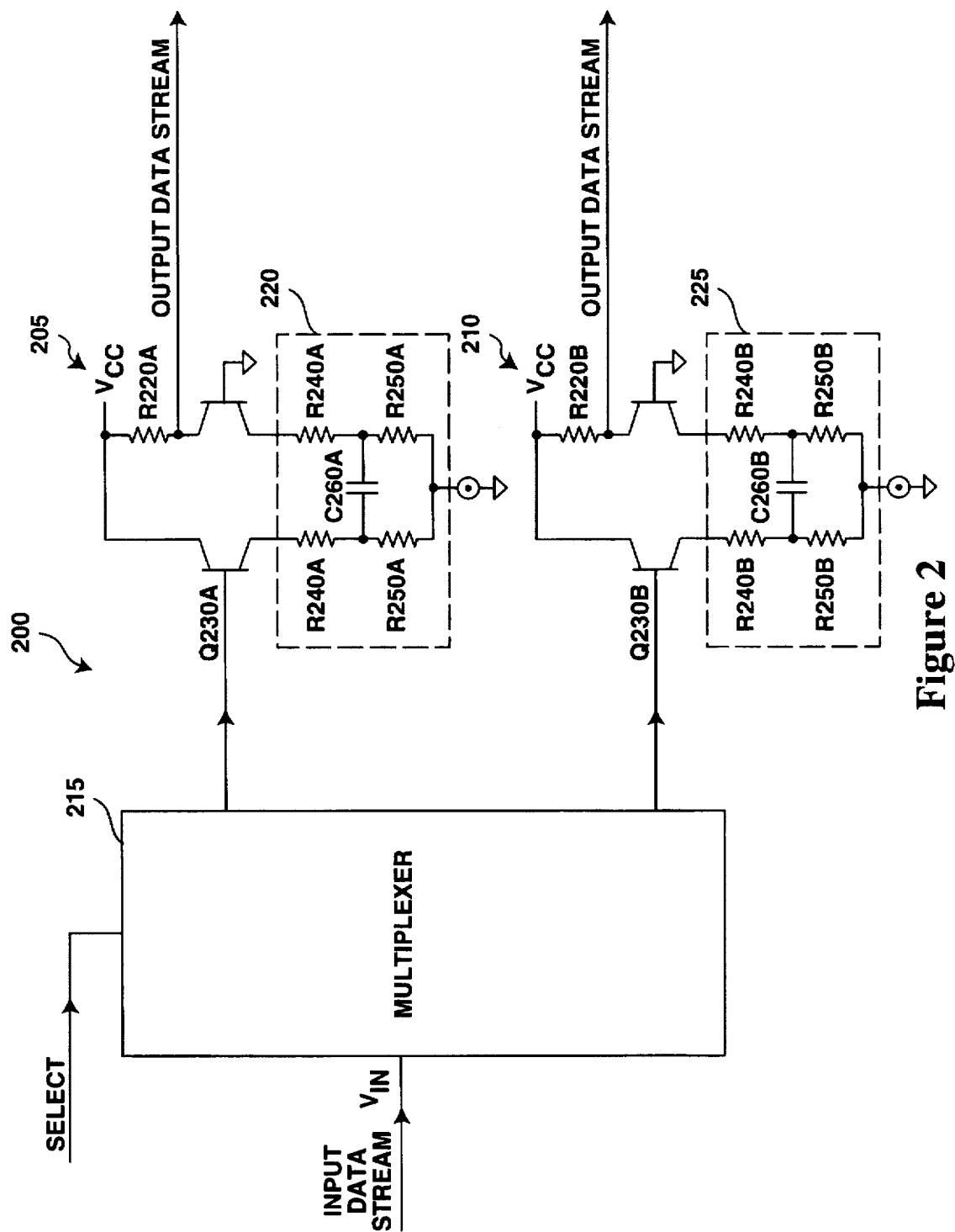
FIG. 2 presents one prior art analog discrete equalizer network that is designed to operate in communication networks that utilize the 4 and 16 MBit Token Ring protocols.
Figure 3:
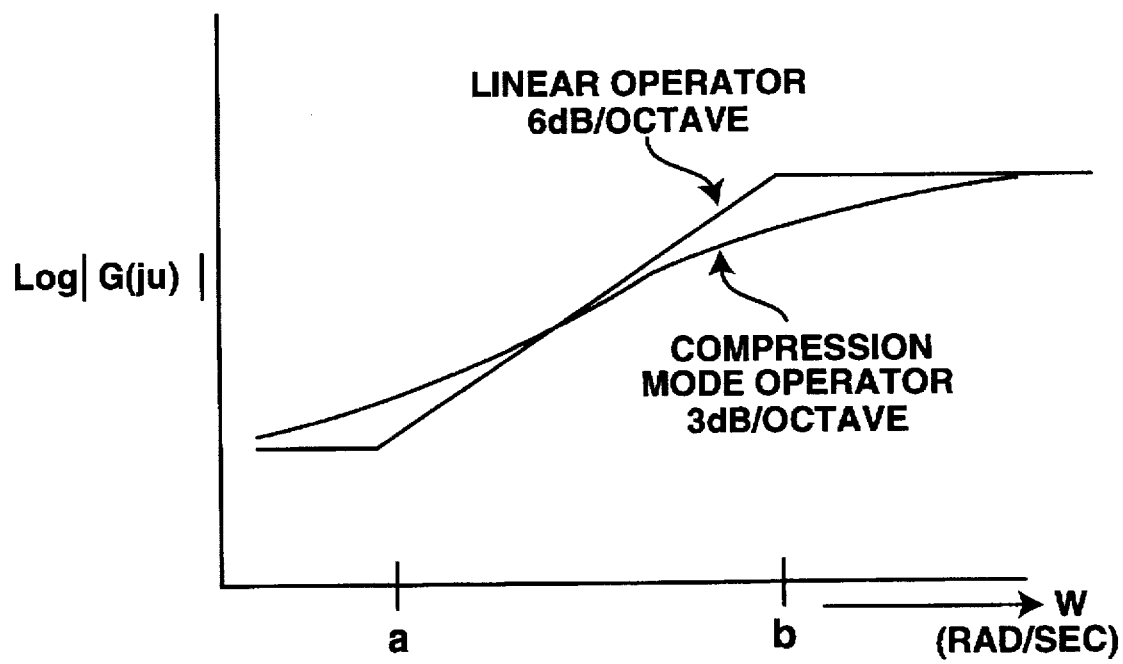
FIG. 3 presents the amplitude compensation plot for an equalizer of the equalizer network of FIG. 2.
Figure 4:
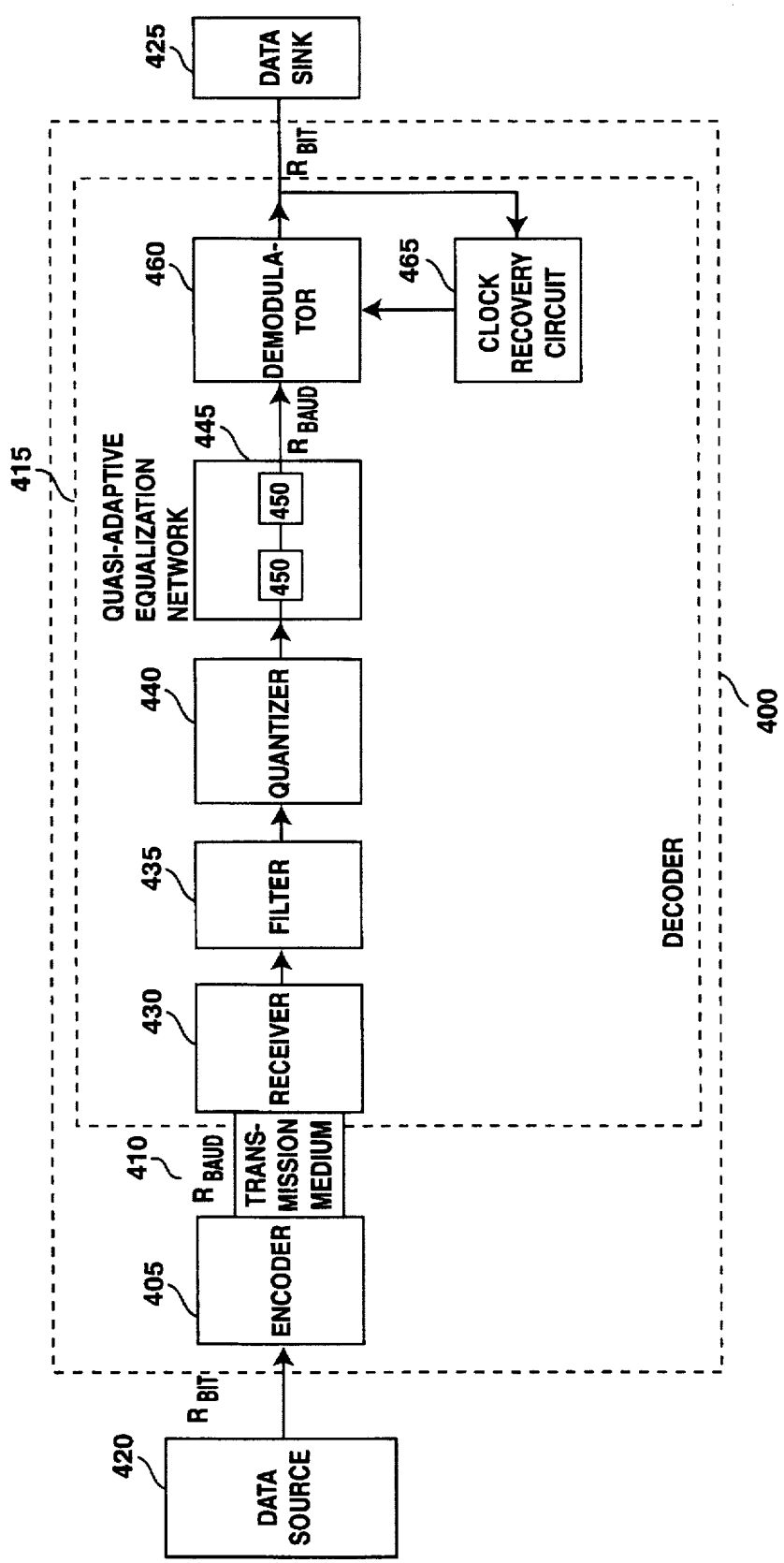
FIG. 4 presents a communication network which includes one embodiment of the present invention's quasi-adaptive analog equalization network.

The present invention provides a quasi-adaptive analog equalization method and apparatus. Quasi-adaptive equalizers base the amount of their phase and amplitude compensation on the amplitude levels of the symbol pulses that they receive. FIG. 4 presents a communication network which includes one embodiment of the present invention's quasi-adaptive analog equalization network. Communication network 400 includes encoder 405, transmission medium 410, and decoder 415 for coupling data source 420 to data sink 425. Data source 420 supplies a data bit stream to encoder 405 at the transmission bit rate $R_{BIT}$. Encoder 405 in turn encodes the bit stream into a plurality of data symbol pulses having a symbol transmission rate $R_{BAUD}$. Encoder 405 then uses transmission medium 410 to transmit the modulated data symbol pulses to receiver 430 of decoder 415 at the symbol transmission rate $R_{BAUD}$.

Receivers 430 then supplies the sequence of symbols to filter 435, which filters out the out-of-bandwidth noise that was picked up during the transmission of the symbols. In turn, filter 435 supplies the sequence of the received symbols to quantizer 440. This quantizer samples the symbols at a sampling frequency equal to or greater than twice the frequency of the maximum frequency component of the transmitted data signals. Quantizer 440 then supplies the sampled symbols to quasi-adaptive equalization network 445, which compensates for amplitude and phase distortions (e.g., compensates for amplitude attenuation and group delay) in the received symbols due to transmission. More specifically, equalization network 445 provides both (1) DC compensation (i.e., frequency independent compensation) to offset phase and amplitude distortion over the data's entire frequency spectrum due to the length of the transmission medium, and (2) AC compensation (i.e., frequency dependent compensation) to offset phase and amplitude distortions of the data's high frequency component due to the varying impedance of the transmission medium.

In one embodiment of the present invention, two cascaded single pole analog equalizers 450 and 455 form quasi-adaptive equalization network 445. Both these cascaded equalizers are quasi-adaptive equalizers which base the amount of their phase and amplitude compensation on the amplitude levels of the symbol pulses that equalizer network 445 receives. In other words, these equalizers quasi-adaptively adjust their compensation based on the received data pulses amplitude levels, which are dependent on the length of the transmission medium. These quasi-adaptive equalizers either operate in a linear mode to provide significant compensation, operate in a compression mode to provide less compensation, or operate in a cut-off mode to provide virtually no compensation.

Moreover, in order to enable these equalizers to provide the necessary phase and amplitude compensation in the frequency range of interest over the predetermined length of transmission medium (e.g., over 0–150 meter range of UTDCAT3 twisted pair cable), both of these cascaded equalizers utilize a compression based biasing design which causes each of these equalizers to operate in their compression mode for predetermined transmission medium lengths. More specifically, since these single pole equalizers over compensate for AC distortions when they operate in their linear mode, (1) equalizer 450 is designed to operate in compression when network 445 receives signals corresponding to a first transmission medium length (i.e., when receiving pulses whose amplitudes are equal to the amplitude of a received symbol pulse which is transmitted over a transmission medium having the first transmission medium length), and (2) equalizer 455 is designed to operate in compression when network 445 receives signals corresponding to a second transmission medium length (i.e., when network 445 receives signal pulses whose amplitudes are equal to the amplitude of a received symbol pulse that is transmitted over a transmission medium having the second predetermined length). Several additional detailed embodiments of the present invention's equalization network will be discussed below by reference to FIGS. 5, 7, and 8.

Quasi-adaptive equalizer 445 then supplies the equalized data symbols to demodulator 460 for converting the data symbol pulses into data bit pulses. More specifically, demodulator 460 (1) samples the incoming symbols at a clock rate determined by clock recovery circuit 465, which uses a well-known prior art clock recovery scheme (such as a phase lock loop clock recovery scheme or a digital delay line recovery scheme) to generate recovered clock signals, and (2) compares these samples to predetermined levels in order to demodulate the incoming symbols into bit pulses. Finally, decoder 415 supplies the demodulated signals to data sink 425 at the bit transmission rate $R_{BIT}$.

Figure 5:
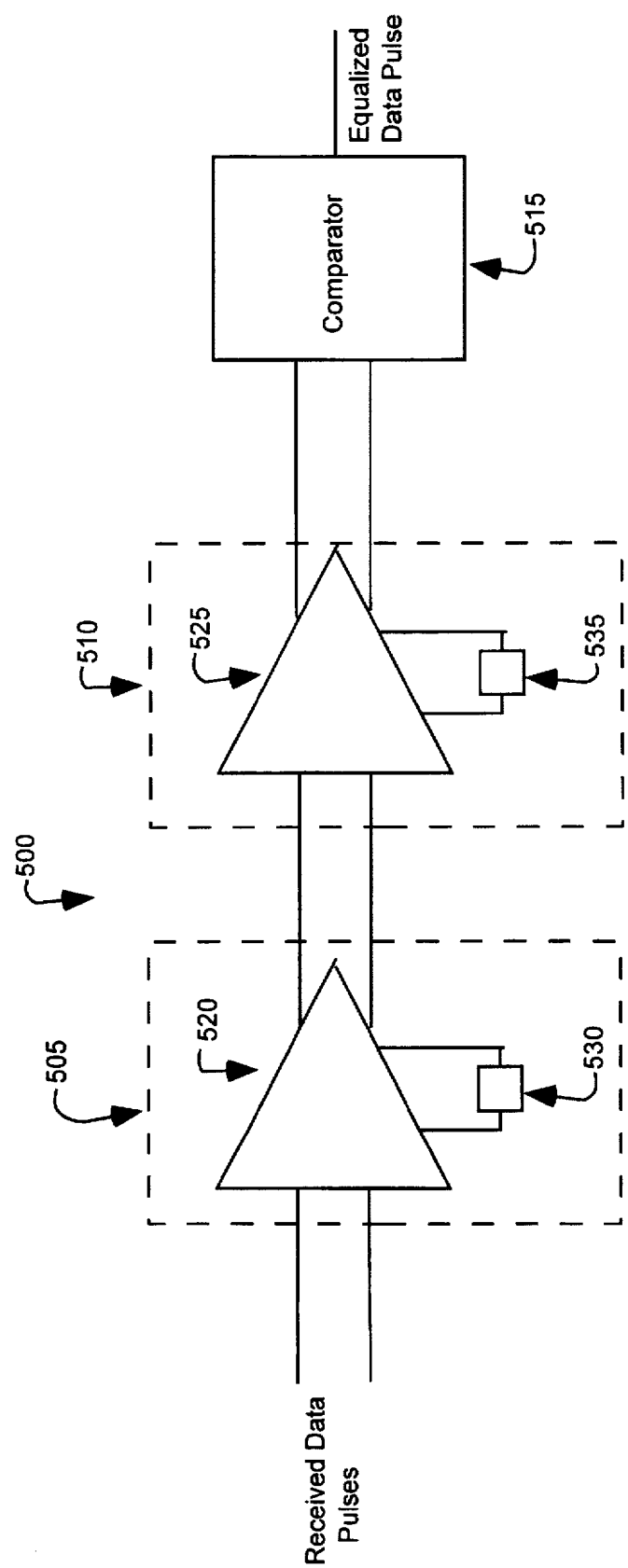
FIG. 5 presents a more detailed embodiment of the equalization network of FIG. 4.

FIG. 5 presents a more detailed embodiment of equalization network 445 of FIG. 4. Equalization network 500 includes cascaded quasi-adaptive equalizers 505 and 510 and comparator 515. Quasi-adaptive equalizers 505 and 510 compensate for phase and amplitude distortions (e.g., compensate for amplitude attenuation and group delay) in the received symbols due to transmission. In addition, comparator 515 compares the differential output signals of equalizer 510 in order to convert these differential signals into single ended output signals.

As shown in this figure, each equalizer includes a differential amplifier (520 or 525) that is coupled to a single pole compensation network (530 or 535). Both single pole compensation networks have reactive elements, which define the frequency range over which their equalizers provide phase and amplitude AC compensation. Thus, depending on the communication protocol used, cascaded equalizers 505 and 510 can be designed to compensate for phase and amplitude degradations in any particular frequency range of interest. For example, in order to operate with Token Ring systems, the reactive elements of the compensation networks are chosen so as to enable equalizers 505 and 510 to provide phase and amplitude compensation in the 1–18 MHz frequency band of the transmitted data. On the other hand, when a 100BaseT4T+Ethernet system is used, equalizers 505 and 510 provide phase and amplitude compensation in the 2–14 MHz frequency band of the transmitted data.

Both of these cascaded equalizers are quasi-adaptive equalizers, which base the amount of their phase and amplitude compensation on the amplitude levels of the symbol pulses that equalizer network 500 receives. In other words, these equalizers quasi-adaptively adjust their compensation based on the received data pulses amplitudes, which are dependent on the length of the transmission medium. Moreover, these quasi-adaptive equalizers have three modes of operation, which are: (1) a linear mode of operation for providing significant phase and amplitude compensation, (2) a compression mode of operation for providing less phase and amplitude compensation, and (3) a cut-off mode of operation for providing virtually no phase and amplitude compensation.

Figure 6A:
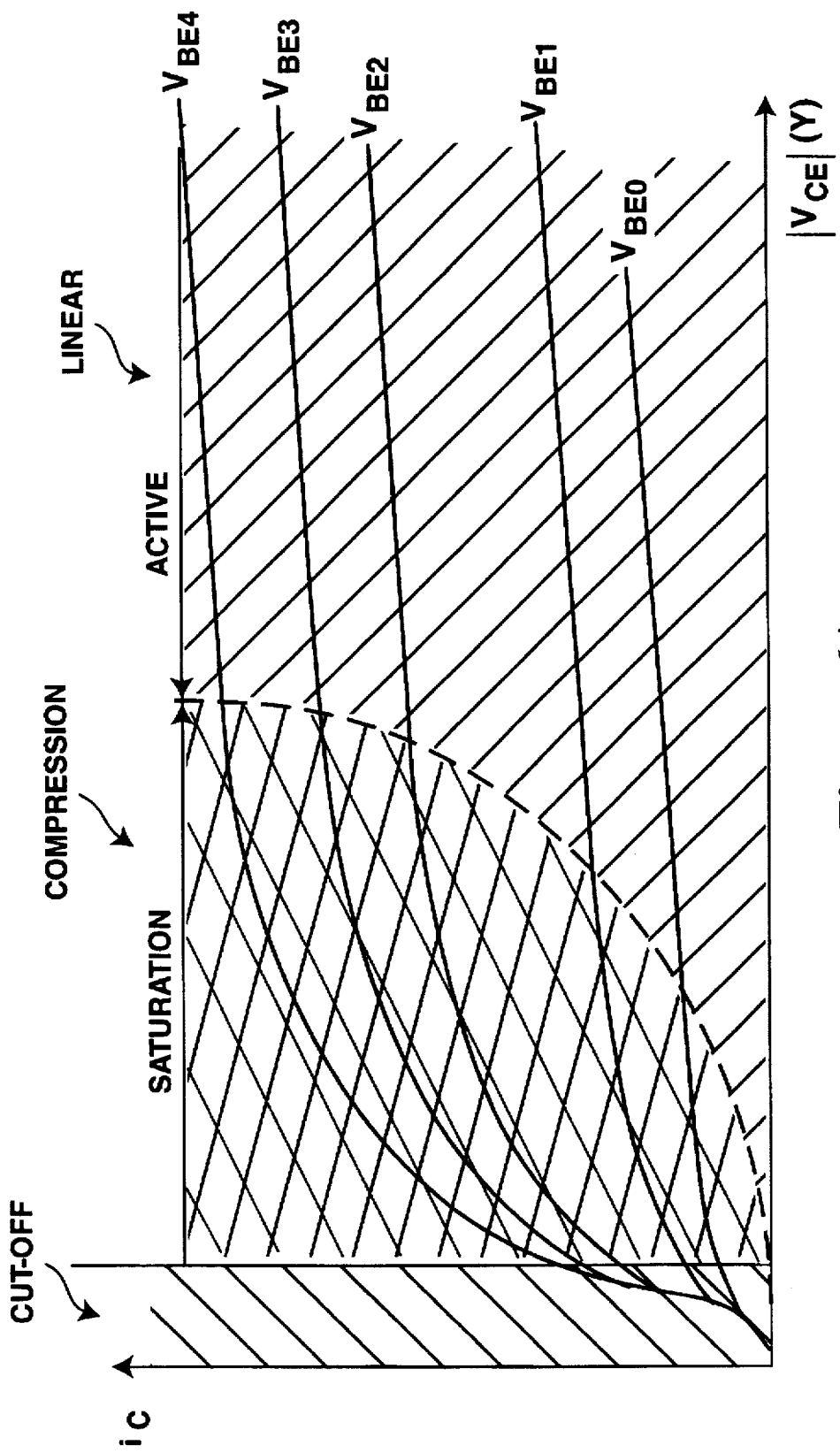
FIG. 6A presents a graph representing the three modes of operation of the equalizers of FIG. 5 when these equalizers have bi-polar transistors as their input transistors.
Figure 6B:
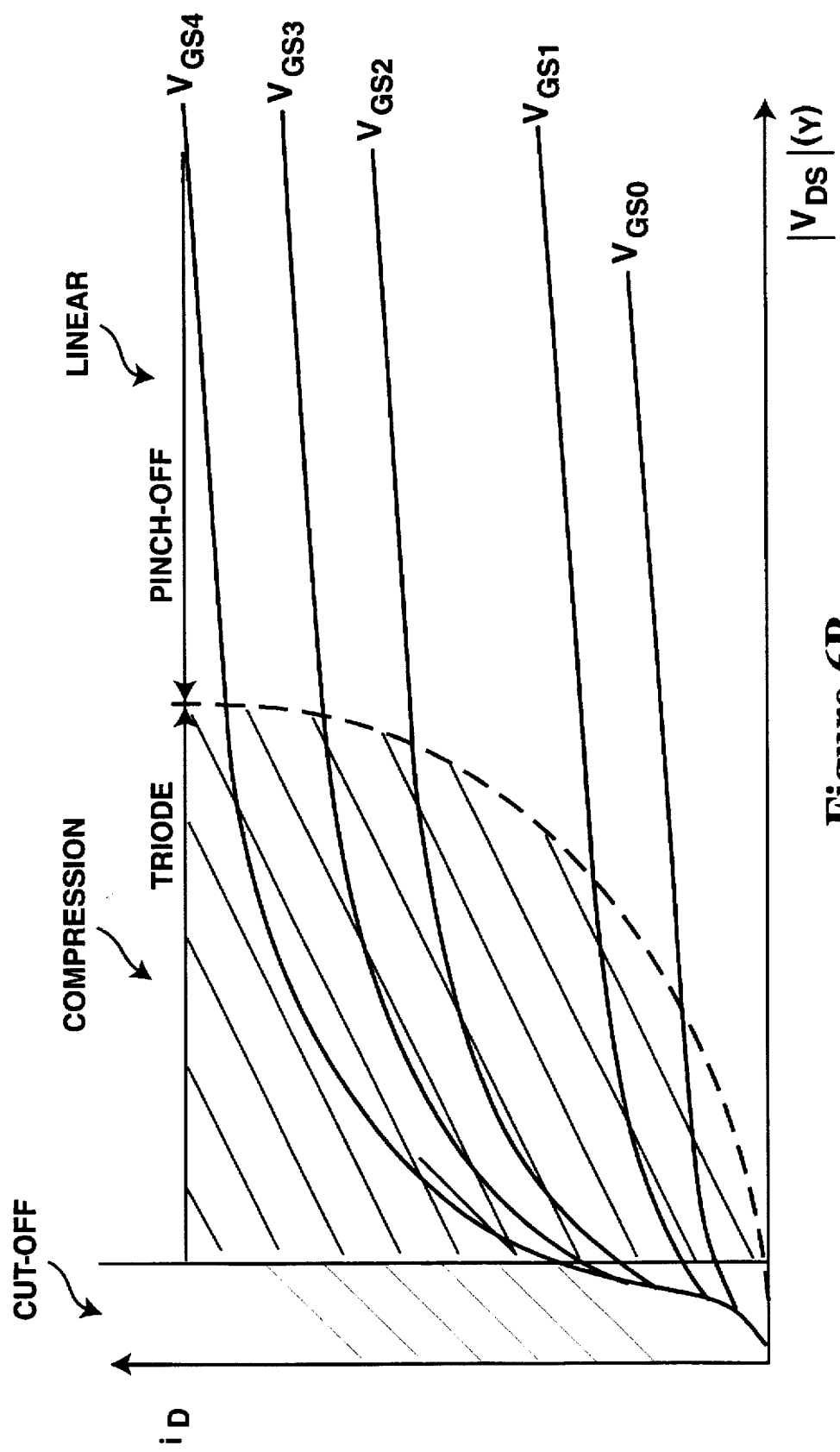
FIG. 6B presents a graph representing the three modes of operation of the equalizers of FIG. 5 when these equalizers have field effect transistors as their input transistors.

As shown in FIG. 6A, for the embodiment of the present invention that use bipolar transistors to form equalizers 505 and 510, these equalizers (1) operate in their linear mode when their input transistors are in their active region, (2) operate in their compression mode (i.e., in their nonlinear mode) when their input transistors are in their saturation region near their active region, and (3) operate in their cut-off mode when their input transistors are in their saturation region far from their active region. Alternatively, as shown in FIG. 6B, when field effect transistors are used to form equalizers 505 and 510, these equalizers (1) operate in their linear region when their input transistors are in their pinch-off region, (2) operate in their compression mode when their input transistors are in their triode region near their pinch-off region, and (3) operate in their cut-off mode when their input transistors are in their triode region far from their pinch-off region.

When these analog single pole equalizers operate in their linear region, they overcompensate for AC distortions. For example, when both equalizers 505 and 510 operate in their linear modes of operation, equalization network 500 provides a 6 dB/frequency-octave amplitude compensation, which in turn overcompensates for the 3 dB/frequency-octave amplitude degradation due to transmission. Consequently, both of these cascaded equalizers utilize a compression based biasing design which causes each of these equalizers to operate in their compression mode for specified transmission medium lengths, in order to enable these equalizers to provide the optimal phase and amplitude compensation in the frequency range of interest over the predetermined length of transmission medium (e.g., in order to provide approximately 3 dB/frequency-octave AC compensation in the frequency range of interest).

More specifically, in order to provide the required compensation (1) equalizer 505 is designed to operate in compression when it receives symbol pulses corresponding to a first specified transmission medium length (e.g., when receiving pulses whose amplitudes are equal to a first predetermined amplitude, which is the amplitude of a received symbol pulse that has been transmitted over a forty meter UTDCAT3 twisted pair cable), and (2) equalizer 510 is designed to operate in compression when equalization network 500 receives symbol pulses corresponding to a second specified transmission medium length (e.g., when equalization network 500 receives pulses whose amplitudes are equal to a second predetermined amplitude, which is the amplitude of a received symbol pulse that has been transmitted over a seventy meter UTDCAT3 twisted pair cable).

Thus, when the transmission medium length is shorter than the first predetermined length, the amplitude levels of the symbol pulses that equalizer network 500 receives are larger than the first predetermined amplitude. These large received pulses in turn overdrive equalizer 505 and 510 (i.e., overdrive the compensation networks) into their cut-off modes to provides virtually no phase and amplitude compensation. When the cable length reaches the first predetermined length, the amplitude levels of the input pulses reach the first predetermined amplitude, which cause first stage equalizer 505 to operate in compression in order to provide the necessary phase and amplitude compensation. However, even at this stage, second stage equalizer 510 still provides no phase and amplitude compensation because the output of first stage equalizer 505 overdrives second stage equalizer 510 (i.e., overdrives compensation network 535) into its cut-off mode. Thus, by biasing first stage equalizer 505 to operate in compression when the transmission medium has the first predetermined length, equalizer network 500 provides the necessary phase and amplitude compensation in the frequency range of interest when using a transmission medium whose length is dose to the first predetermined length.

As the transmission medium length increases past the first predetermined length, first stage equalizer 505 begins to operate in its linear mode to provide additional phase and amplitude compensation. However, once the transmission medium length becomes significantly larger than the first predetermined length, even the linear compensation provided by first stage equalizer 505 does not offset the distortions due to the transmission. Consequently, as the transmission medium length increases past the first predetermined length to reach the second predetermined transmission medium length (which thereby causes the amplitudes of the received symbol pulses to decrease below the first predetermined amplitude to reach the second predetermined amplitude), second stage equalizer 510 starts to operate in its compression mode to provide the required DC and AC compensation (e.g., to provide the required additional DC compensation and the required 3 dB/frequency-octave AC amplitude compensation). As the transmission medium length increases past the second predetermined length, second stage equalizer 510 begins to operate in a linear mode to provide additional phase and amplitude compensation. In this manner, equalizers 505 and 510 quasi-adaptively compensate for phase and amplitude degradations by continuously adapting their compensation based on the length of the transmission medium up to a third predetermined transmission line length (e.g., by continuously adapting their compensation up to 150 meters of UTDCAT3 cable).

As shown in FIG. 5, second stage equalizer 510 supplies its equalized output to comparator 515. This comparator then converts its differential input signals into a single ended output signal. Numerous prior art comparators can serve as comparator 515. However, for purpose of explanation, one embodiment of comparator 515 is set forth in FIG. 9. In addition, more detailed embodiments of equalizer 520 and 525 will be described below by reference to equalizers 801 and 802 of FIG. 8.

Figure 7:
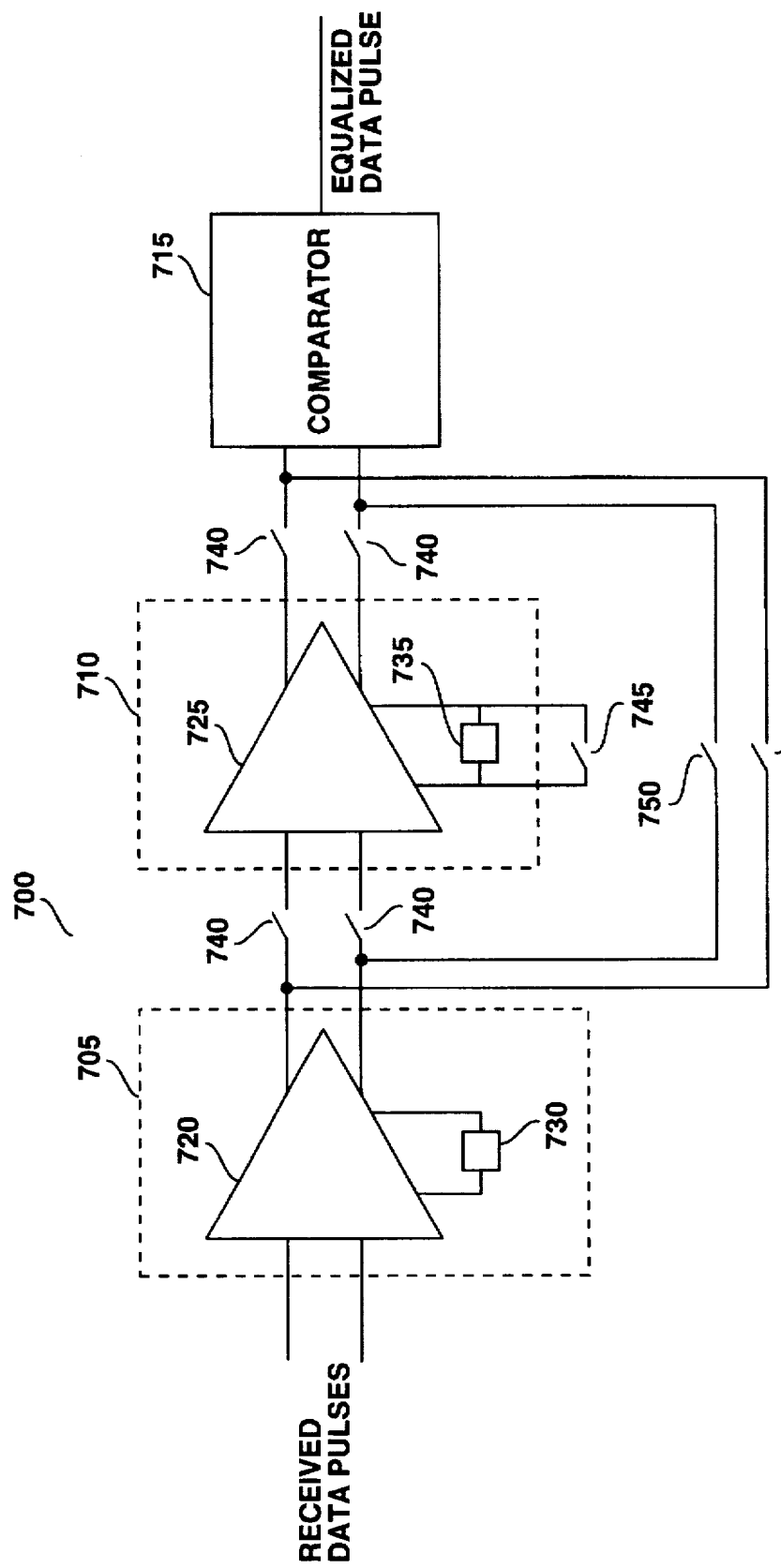
FIG. 7 presents another embodiment of the present invention's equalization apparatus.

FIG. 7 presents another embodiment of the present invention's equalization apparatus. Equalization network 700 is designed to operate in communication networks that utilize either the 4 MBit Token Ring protocol or the 16 MBit Token Ring protocol. This equalization network includes cascaded quasi-adaptive equalizers 705 and 710, comparator 715, and switches 740, 745, and 750. Quasi-adaptive equalizers 705 and 710 compensate for phase and amplitude distortions (e.g., compensate for amplitude attenuation and group delay) in the received symbols due to transmission. In addition, comparator 715 compares the differential output signals of equalizer 710 in order to convert these differential signals into single ended output signals.

Furthermore, depending on the state of switches 740, 745, and 750, equalizer network 700 operates in one of the following four modes: (1) a short line 4 MBit mode for providing compensation for 4 MBit Token Ring systems that use twisted pair cables that are shorter than 100 meters, (2) a long line 4 MBit mode for providing compensation for 4 MBit Token Ring systems that use twisted pair cables that are up to 120 meters long, (3) a short line 16 MBit mode for providing compensation for 16 MBit Token Ring systems that use twisted pair cables shorter than 100 meters, and (4) a long line 16 MBit mode for providing compensation for 16 MBit Token Ring systems that use twisted pairs that are up to 150 meters long. However, before discussing the selective operation of the switching circuitry to select a particular mode of operation, the continuous cascaded operation of equalizer network 700 (i.e., the operation of equalization network 700 when switches 740 are closed while switches 745 and 750 are opened) will first be described.

As mentioned before, quasi-adaptive equalizers 705 and 710 compensate for phase and amplitude distortions in the received symbols due to the transmission of data over twisted pair cables. As shown in FIG. 7, each equalizer includes a differential amplifier (720 or 725) that is coupled to a single pole compensation network (730 or 735). Both single pole compensation networks have reactive elements, which define the frequency range over which their equalizers provide the phase and amplitude AC compensation.

More specifically, in order operate with both the 4 MBit and the 16 MBit Token Ring protocols, first stage equalizer 705 is designed for the 4 MBit Token Ring operation (i.e., the reactive elements of compensation networks 730 are chosen so as to enable equalizer 705 to provide phase and amplitude AC compensation in the 1–6 MHz frequency band of the transmitted data), while the combination of first stage equalizer 705 and second stage equalizer 710 is designed for the 16 MBit Token Ring operation (i.e., the combination of the reactive elements of compensation networks 730 and 735 are chosen to enable equalizers 705 and 710 to provide phase and amplitude compensation in the 1–18 MHz frequency band of the transmitted data).

Both of these cascaded equalizers are quasi-adaptive equalizers, which base the amount of their phase and amplitude compensation on the amplitude levels of the symbol pulses that equalization network 700 receives. In other words, these equalizers quasi-adaptively adjust their compensation based on the received data pulses amplitudes, which are dependent on the length of the twisted pair cables. Moreover, these quasi-adaptive equalizers have three modes of operation, which are: (1) a linear mode of operation for providing significant phase and amplitude, (2) a compression mode of operation for providing less phase and amplitude compensation, and (3) a cutoff mode of operation for providing virtually no phase and amplitude compensation.

As shown in FIG. 6A, for the embodiments of the present invention that use bipolar transistors to form equalizers 705 and 710, these equalizers (1) operate in their linear mode when their input transistors are in their active region, (2) operate in their compression mode (i.e., in their nonlinear mode) when their input transistors are in their saturation region near their active region, and (3) operate in their cut-off mode when their input transistors are in their saturation region far from their active region. Alternatively, as shown in FIG. 6B, when field effect transistors are used to form equalizers 705 and 710, these equalizers (1) operate in their linear region when their input transistors are in their pinch-off region, (2) operate in their compression mode when their input transistors are in their triode region near their pinch-off region, and (3) operate in their cut-off mode when their input transistors are in their triode region far from their pinch-off region.

When these analog single pole equalizers operate in their linear region, they overcompensate for AC distortions. For example, when both equalizers 705 and 710 operate in their linear modes of operation, equalization network 700 provides a 6 dB/frequency-octave amplitude compensation, which in turn overcompensates for the 3 dB/frequency-octave amplitude degradation due to transmission. Consequently, both of these cascaded equalizers utilize a compression based biasing design which causes each of these equalizers to operate in their compression mode for specified twisted pair lengths, in order to enable these equalizers to provide the optimal phase and amplitude compensation in the frequency range of interest for 0 to 150 meters of UTDCAT3 twisted pair cables.

More specifically, in order to provide the required compensation, (1) equalizer 705 is designed to operate in compression when it receives symbol pulses corresponding to a first specified twisted pair length (e.g., when receiving pulses whose amplitudes are equal to 2.5 volts, which is the amplitude of a received symbol pulse that has been transmitted over a forty meter UTDCAT3 twisted pair cable), and (2) equalizer 710 is designed to operate in compression when equalization network 700 receives symbol pulses corresponding to a second specified twisted pair length (e.g., when equalization network 700 receives pulses whose amplitudes are equal to 1.4 volts, which is the amplitude of a received symbol pulse that has been transmitted over a seventy meter UTDCAT3 twisted pair cable).

Thus, when the cable length is shorter than the first predetermined length, the amplitude levels of the symbol pulses that equalization network 700 receives are larger than the first predetermined amplitude. These large received pulses in turn overdrive equalizer 705 and 710 (i.e., overdrive the compensation networks) into their cut-off modes to provides virtually no phase and amplitude compensation. When the cable length reaches the first predetermined length, the amplitude levels of the input pulses reach the first predetermined amplitude, which cause first stage equalizer 705 to operate in compression in order to provide the necessary phase and amplitude compensation. However, even at this stage, second stage equalizer 710 still provides no phase and amplitude compensation because the output of first stage equalizer 705 overdrives second stage equalizer 710 (i.e., overdrives the compensation network 735) into its cut-off mode. Thus, by biasing first stage equalizer 705 to operate in compression when the twisted pair length equals the first predetermined length, equalization network 700 provides the necessary phase and amplitude compensation in the frequency range of interest when using a cable whose length is close to the first predetermined length.

As the cable length increases past the first predetermined length, first stage equalizer 705 begins to operate in its linear mode to provide additional phase and amplitude compensation. However, once the cable length becomes significantly larger than the first predetermined length, even the linear compensation provided by first stage equalizer 705 does not offset the distortions due to the transmission. Consequently, as the cable length increases past the first predetermined length to reach the second predetermined length (i.e., as the amplitudes of the received symbol pulses decrease below the first predetermined amplitude to reach the second predetermined amplitude), second stage equalizer 710 starts to operate in its compression mode to provide the required DC and AC compensation (e.g., to provide the required additional DC compensation and the required 3 dB/frequency-octave AC amplitude compensation). As the cable length increases past the second predetermined length, second stage equalizer 710 begins to operate at its linear mode to provide additional phase and amplitude compensation. In this manner, equalizers 705 and 710 quasi-adaptively compensate for phase and amplitude degradations by continuously adapting their compensation based on the length of the twisted pair cables up to a third predetermined cable length (e.g., 150 meters).

As mentioned before, equalizer network 700 operates in one of four modes depending on the state of switches 740, 745 and 750. For example, equalizer network 700 operates in a short line 4 MBit mode (to provide compensation for 4 MBit Token Ring systems that use twisted pair cables that are shorter than or equal to 100 meters) when switches 750 are closed and switches 740 and 745 are opened in order to create a first bypass path for completely bypassing second stage equalizer 710.

On the other hand, equalizer network 700 operates in a long line 4 MBit mode (to provide compensation for 4 MBit Token Ring systems that use twisted pair cables that are up to 120 meters long) and a long line 16 MBit mode (to provide compensation for 16 MBit Token Ring systems that use twisted pairs that are up to 150 meters long), when switches 745 and 750 are opened and switches 740 are closed (i.e., when neither second stage equalizer 710 nor its compensation network 735 are bypassed). Finally, equalizer network 700 operates in a short line 16 MBit mode (to provide compensation for 16 MBit Token Ring systems that use twisted pair cables that are shorter than or equal to 100 meters) when switches 740 and 745 are closed and switches 750 are opened, in order to create a second bypass path for bypassing compensation network 735 of second stage equalizer 710. In other words, by closing switches 740 and 745 and opening switches 750, compensation network 735 is bypassed, which in turn causes second stage equalizer 710 to shift the transfer function of the equalization network into the correct frequency region by causing this equalizer to only provide the built-in gain associated with differential amplifier 725.

FIG. 8 presents a circuit level diagram for one embodiment of equalization network 700. Equalization network 800 includes first stage equalizer 801, second stage equalizer 802, switching control logic 803, switches 804–806, unity gain amplifier 828, and comparator 807. Quasi-adaptive equalizers 801 and 802 compensate for phase and amplitude distortions (e.g., compensates for amplitude attenuation and group delay) in the received symbols due to transmission. In addition, comparator 807 compares the differential output signals of equalizer 802 in order to convert these differential signals into single ended output signals.

Figure 8A:
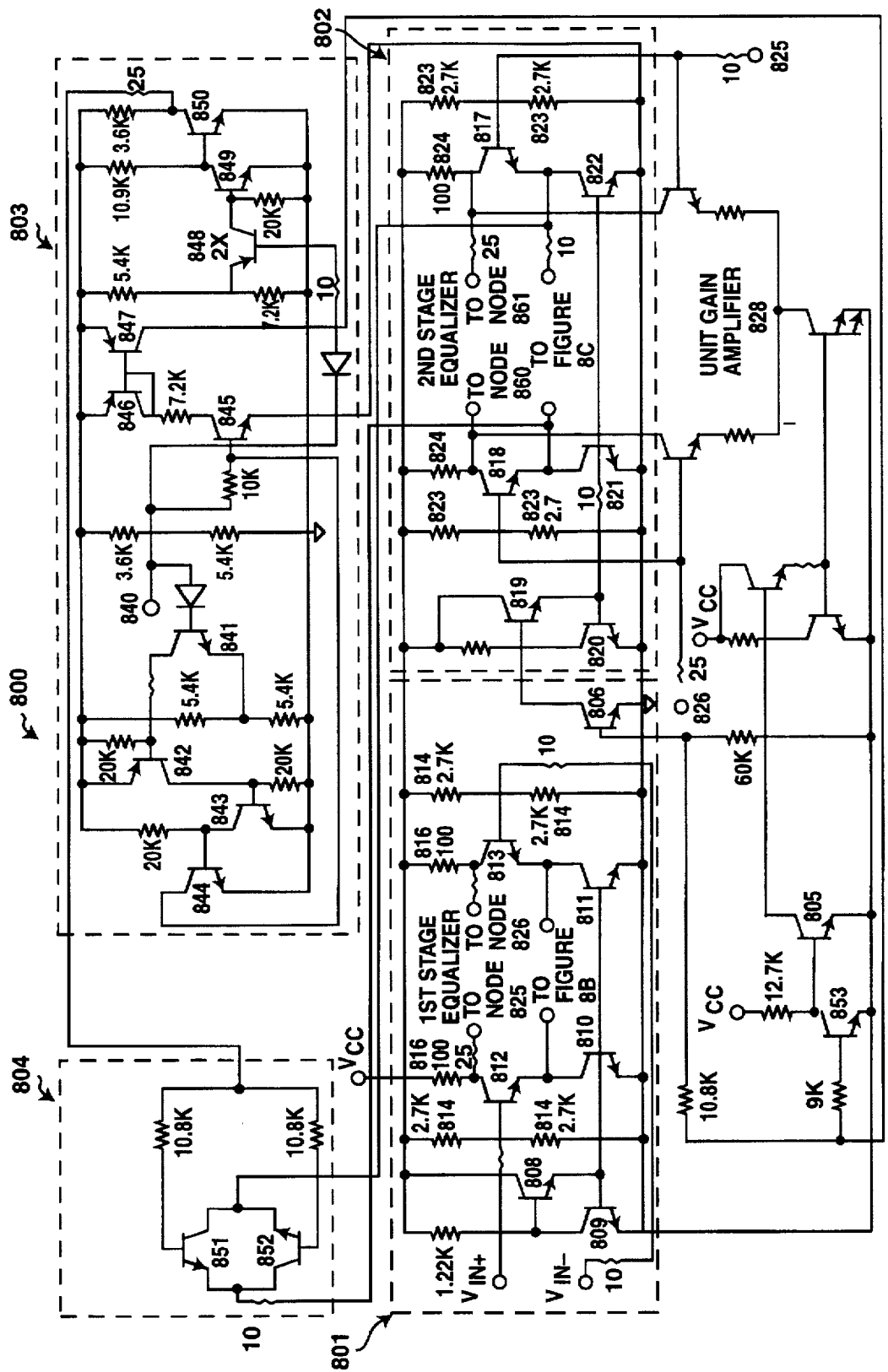
FIGS. 8A–8D present a circuit level diagram of the equalization apparatus of FIG. 7.
Figure 8C:
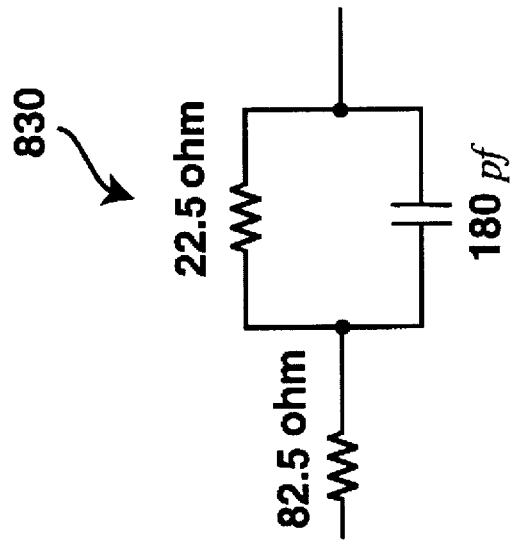
Figure 8B:
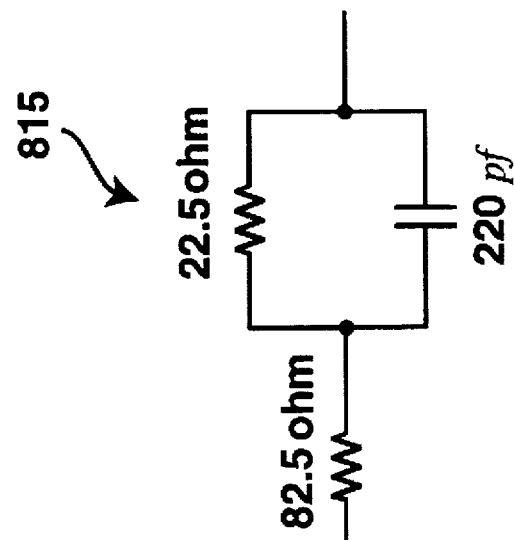

First stage equalizer 801 includes a differential amplifier (which is shown in FIG. 8A) and a compensation network (which is shown in FIG. 8B). The differential amplifier includes transistors 808–811, which serve as a current generation circuitry for establishing the quiescent current of this amplifier. This current generation circuitry of first stage equalizer 801 includes transistor 808 in order to cause a constant current to flow through transistor 809 by damping the voltage at the collector of transistor 809 at two diode drops above the ground potential. In turn, the current flow through transistor 809 is mirrored into transistors 810 and 811 in order to establish the quiescent current of the amplifier. It should be noted that instead of using one current driving transistor to set the bias current through the input stage, the differential amplifier of first stage equalizer 801 utilizes two current driving transistors 810 and 811, in order to isolate the shaping function of the compensation network from the DC biasing function of the current generation circuitry. In other words, the current generation circuitry does not influence the operation of the compensation network because (as opposed to using one current driving transistor to establish the current in both branches of the differential amplifier) one current driving transistor is used to establish the bias current through each branch of the differential amplifier.

As shown in FIG. 8A, the differential amplifier of first stage equalizer 801 also includes differential input transistors 812 and 813, which receive the differential input signals at their bases. In one embodiment of the present invention, the bases of these two input transistors are coupled to each other through back-to-back diode connected transistors, in order to prevent the input stage from being overdriven way into saturation, which would thereby limit the maximum frequency of the device by increasing the recovery time of the device. Furthermore, the bases of these differential input transistors are coupled to resistors 814, which set the operating DC voltages for these input transistors.

The emitters of differential input transistors 812 and 813 are coupled together through first stage equalizer's compensation network 815, which is set forth in FIG. 8B. As mentioned before, single pole compensation network 815 defines the frequency range over which first stage equalizer 801 provides phase and amplitude AC compensation. Furthermore, the gain of first stage equalizer 801 is equal to the ratio of the input transistor's collector resistance over its emitter resistances (e.g., is equal to the resistance of load resistor 816 divided by the resistance in the emitter of transistor 812). Furthermore, the value of load resistors 816 determines when the first stage equalizer enters compression. In other words, load resistors 816 are particularly selected to set the compression biasing design of first stage equalizer 801. For example, for the embodiment of the present invention that is set forth in FIG. 8A, load resistors 816 cause first stage equalizer to start to operate in compression when receiving symbol pulses corresponding to a 40 meter twisted pair cable (e.g., when receiving pulses whose amplitude equals 2.5 volts).

The output of first stage equalizer 801 is then supplied to the input of second stage equalizer 802 by coupling the collector of transistor 812 to the base of transistor 817 and the collector of transistor 813 to the base of transistor 818. Second stage equalizer 802 includes a differential amplifier (which is shown in FIG. 8A) and a compensation network (which is shown in FIG. 8C). The differential amplifier includes transistors 819–822, which serve as a current generation circuitry for establishing the quiescent current of this amplifier. This current generation circuitry of second stage equalizer 802 includes transistor 819 in order to cause a constant current to flow through transistor 820 by clamping the voltage at the collector of transistor 820 at two diode drops above the ground potential. In turn, the current flow through transistor 820 is mirrored into transistors 821 and 822 in order to establish the quiescent current of the amplifier. It should be noted that instead of using one current driving transistor to set the bias current through the input stage, the differential amplifier of second stage equalizer 802 utilizes two current driving transistors 821 and 822, in order to isolate the shaping function of the compensation network from the DC biasing function of the current generation circuitry. In other words, the current generation circuitry does not influence the operation of the compensation network because (as opposed to using one current driving transistor to establish the current in both branches of the differential amplifier) one current driving transistor is used to establish the bias current through each branch of the differential amplifier.

Figure 8D:
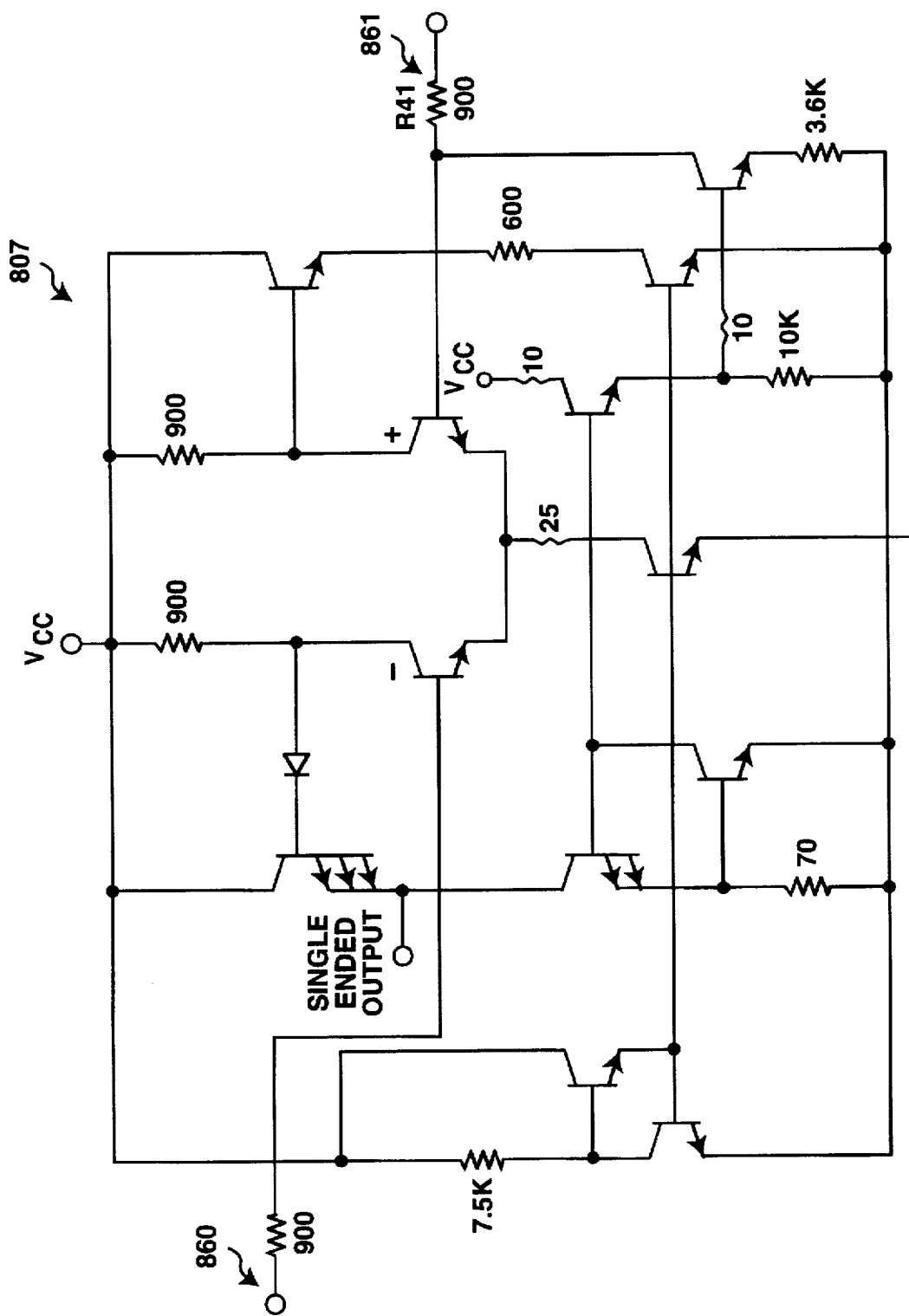

As shown in FIG. 8A, the differential amplifier of second stage equalizer 802 also includes differential input transistors 817 and 818, which receive the differential output signals of first stage equalizer 801 at their bases. The bases of these differential input transistors are coupled to resistors 823, which set the operating DC voltages for these input transistors. Furthermore, the emitters of differential input transistors 817 and 818 are coupled together through second stage equalizer's compensation network 830, which is set forth in FIG. 8C. As mentioned before, single pole compensation network 830 defines the frequency range over which second stage equalizer 802 provides phase and amplitude AC compensation. Moreover, the gain of second stage equalizer 802 is equal to the ratio of an input transistor's collector resistance over its emitter resistances (e.g., is equal to the resistance of load resistor 824 divided by the resistance in the emitter of transistor 818). Furthermore, the value of load resistors 824 determines when the second stage equalizer enters compression. In other words, load resistors 824 are particularly selected to set the compression biasing design of second stage equalizer 802. For example, for the embodiment of the present invention that is set forth in FIG. 8A, load resistors 824 cause second stage equalizer 802 to start to operate in compression when receiving symbol pulses corresponding to a 70 meter twisted pair cable (e.g., when receiving pulses whose amplitude equals 1.4 volts). Moreover, as shown in FIG. 8D, second stage equalizer 802 supplies its equalized output to comparator 807. Comparator 807 is a nonsaturating comparator. In other words, comparator 807 can take fairly large input swings without saturating.

For the embodiment of equalization network 700 that is set forth in FIG. 8A, switches 740 are implemented by transistor 806, switches 750 are implemented by unity gain amplifier 828 and transistor 805, and switch 745 is implemented by switch 804. It should be noted that instead of having stacked devices to turn off second stage equalizer 802 and unity gain amplifier 828, the embodiment of the present invention that is set forth in FIG. 8A uses shunting switch transistors 805 and 806 which, when on, drain the current from their respective amplifiers by providing the bias current of the amplifiers with a lower impedance path to flow through. In other words, when the base voltage of shunting switch transistor 806 is high, this transistor turns off the differential amplifier of second stage equalizer 802 by draining the current from its current generation circuitry. Similarly, when the base voltage of shunting switch transistor 805 is high, this transistor turns off unity gain amplifier 828 by draining the biasing current in this amplifier's current generation circuitry.

Furthermore, the switches of equalization network 800 are manipulated by switching control logic 803, which is a single line tristate control circuit. By manipulating the voltage on single input line 840, a user can completely bypass the second stage equalizer, can bypass the compensation network of the second stage equalizer, or can activate the second stage equalizer, in order to place equalization network 800 in one of four operating modes. For example, by supplying a voltage that is less than two volts, a user can bypass the compensation network of the second stage equalizer. More specifically, when the voltage at node 840 is less than 2 volts, (1) transistors 848 and 849 are on while transistor 850 is off, which in turn turns on transistors 851 and 852 to short-out compensation network 830, and (2) transistors 841–843 and 845 are off which prevents any currents from flowing through transistor 847, which thereby turns off transistors 806 and 853 while turning on transistor 805 (to drain the current from the unity gain amplifier).

On the other hand, second stage equalizer 802 is completely active when the voltage at node 840 is between 2 volts and 3.6 volts. More specifically, when the voltage at node 840 is between 2 volts and 3.6 volts, (1) transistors 848–850 are all partially on, which in turn turns off transistors 851 and 852 and thereby prevents compensation network 830 from being shorted out, and (2) transistors 841–843 and 845 are off which prevents any currents from flowing through transistor 847, which thereby turns off transistors 806 and 853 while turning on transistor 805. Finally, when the voltage at node 840 is greater than 3.6 volts, transistors 841–843 are turned on, and transistor 844 is turned off, transistor 845 is turned on, which causes a current to flow through transistor 847, which in turn, turns on transistors 806 and 853 while turning off transistor 805 (to turn on unity gain amplifier 828 while turning off the differential amplifier of second stage equalizer 802).

Figure 9:
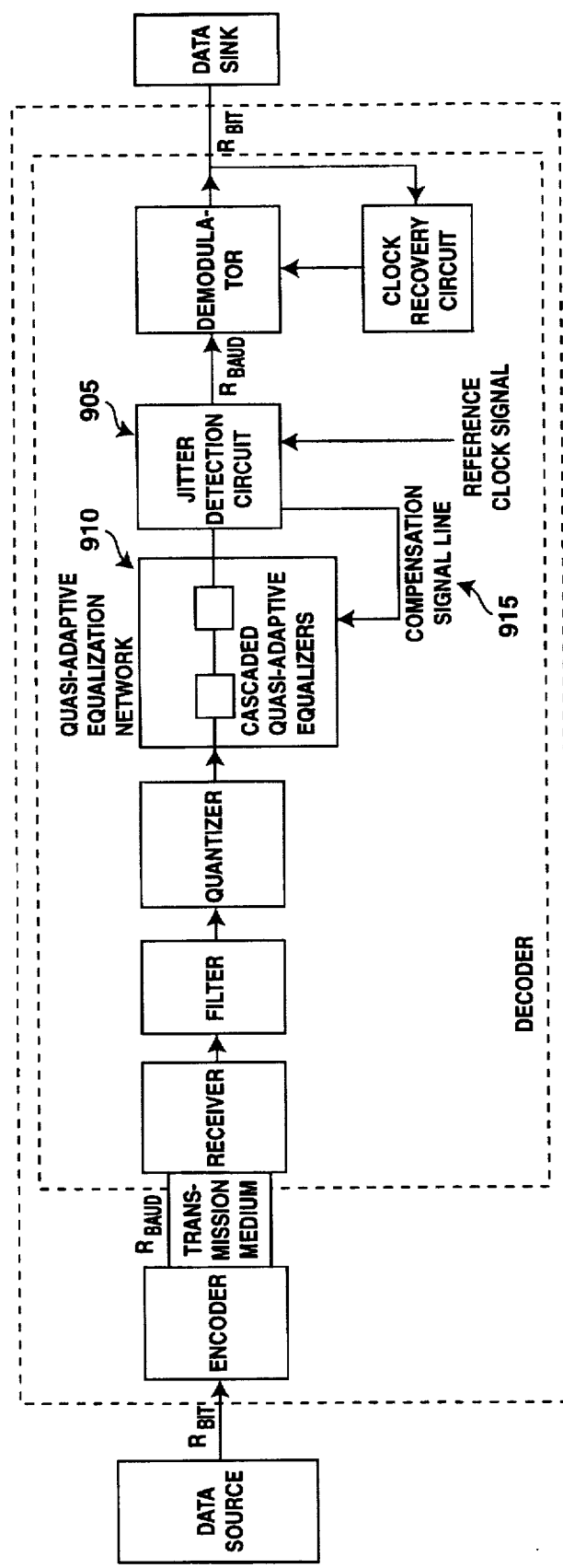
FIG. 9 presents a communication network which includes one embodiment of the present invention's quasi-adaptive analog equalization network coupled to a jitter detection circuit, which adjusts the compensation provided by the equalization network based on the amount of jitter that it detects.

FIG. 9 presents a communication network which includes one embodiment of the present invention's quasi-adaptive analog equalization network coupled to a jitter detection circuit, which adjust the compensation provided by the equalization network based on the amount of jitter that it detects. Jitter detection circuit 905 receives the output of equalization network 910 (which in one embodiment of the present invention is the quasi-adaptive equalization network 800 of FIG. 8) in order to determine the amount of correlated jitter in the equalized data. Several embodiments of jitter detection circuit 905 are set forth in the U.S. patent application for "A Jitter Detection Method and Apparatus," which was filed on Mar. 30, 1995 by the assignee of this application and has the Ser. No. 08/413,186. This application for "A Jitter Detection Method and Apparatus" is incorporated here by reference.

Based on the amount of the detected jitter, jitter detection circuit 905 then informs quasi-adaptive equalization network of the degree of phase and amplitude compensation that it needs to provide. For example, when quasi-adaptive equalization network 910 is the quasi-adaptive equalization network that is set forth in FIG. 8, jitter detection circuit 905 (1) determines the amount of correlated jitter in the equalized output of equalization network 800, and (2) based on this determination supplies a voltage to single input line 840 of switching control logic 803 in order to cause the switching control logic to adjust the equalization network's compensation by manipulating the switches. For instance, if equalization network 800 does not provide the required phase and amplitude compensation by operating in a short line 16 megabits mode, jitter detection circuit 905 (1) will detect an excessive amount of correlated jitter in the equalized output of equalizer 802, and thereby (2) will supply (on compensation line 915) a signal between 2 volts and 3.6 volts to input line 840, which in turn causes equalization network 800 to operate in a long line mode to provide additional phase and amplitude compensation by turning off unity gain amplifier 828 and shunting switch 804.

One of ordinary skill in the art would recognize that the above-described invention may be embodied in other specific forms without departing from the spirit or the essential characteristics of the disclosure. For instance, in alternative embodiments of the present invention, more than two quasi-adaptive equalizers are cascaded. For example, one embodiment of the present invention provides continuous phase and amplitude compensation by cascading five quasi-adaptive equalizers and by designing each of these equalizers to operate in compression for one of five particular transmission medium lengths. Thus, while certain exemplary embodiments have been described and shown in the accompanying drawings, the invention is not to be limited by the foregoing illustrative details but rather is to be defined by the appended claims.

What is claimed is:

1. A quasi-adaptive analog equalization apparatus for compensating for phase and amplitude degradation of a first set of data transmitted over a transmission medium, said apparatus comprising:

(a) a first quasi-adaptive equalizer for receiving said first set of data and for adjusting the amplitude and phase of said first set of data to produce a second set of data;

(b) a second quasi-adaptive equalizer for receiving said second set of data and for adjusting the amplitude and phase of said second set of data to produce an equalized set of data;

(c) wherein both said quasi-adaptive equalizers adjust their compensation based on the amplitude levels of said sets of data and a compression based biasing scheme, wherein said first quasi-adaptive equalizer operates in a compression mode when it receives a data pulse having a first predetermined amplitude corresponding to a first predetermined length of said transmission medium, and said second quasi-adaptive equalizer operates in said compression mode when it receives a data pulse having a second predetermined amplitude corresponding to a second predetermined length of said transmission medium.

2. The quasi-adaptive analog equalization apparatus of claim 1, wherein said first equalizer has a first compensation network and said second equalizer has a second compensation network, wherein said compensation networks have reactive elements defining a frequency range over which said equalizers provide phase and amplitude compensation.

3. The quasi-adaptive analog equalization apparatus of claim 2,
   (a) wherein said first equalizer further has a first differential amplifier coupled to said first compensation network, said first differential amplifier having a first differential input and a first differential output, said first differential input for receiving said first set of data;
   (b) wherein said second equalizer further has a second differential amplifier coupled to said second compensation network, said second differential amplifier having a second differential input and a second differential output, said second differential input coupled to said first differential output for receiving said second set of data, wherein said second equalizer produces said equalized set of data at said second differential output.

4. The quasi-adaptive analog equalization apparatus of claim 3,
   (a) wherein said first compensation network defines a first range over which said first equalizer provides phase and amplitude compensation and said second compensation network defines a second range over which said second equalizer provides phase and amplitude compensation;
   (b) wherein said equalization apparatus operates in a first compensation mode when said second equalizer is bypassed, operates in a second compensation mode when said second compensation network is bypassed, and operates in a third compensation mode when neither said second equalizer nor said second compensation network is bypassed.

5. The quasi-adaptive analog equalization apparatus of claim 4, wherein said quasi-adaptive analog equalization apparatus further comprises a first set of switches, a second set of switches, and a third set of switches,
   (a) said first set of switches for creating a first bypass path for enabling said equalization apparatus to operate in said first compensation mode by bypassing said second equalizer when said first set of switches are closed and said second and third set of switches are opened;
   b) said second set of switches for creating a second bypass path for enabling said equalization apparatus to operate in said second compensation mode by bypassing said second compensation network when said second and third set of switches are closed and said first set of switches are opened;
   (c) wherein said equalization apparatus operates in said third compensation mode when said third set of switches are closed and said first and second set of switches are opened.

6. The quasi-adaptive analog equalization apparatus of claim 5 further comprising a switching control logic for controlling the operation of said sets of switches.

7. The quasi-adaptive analog equalization apparatus of claim 6 wherein said switching control logic is a single line tristate switching control logic.

8. A decoder for receiving a first set of data pulses from a transmission medium, said decoder comprising:
   a quasi-adaptive analog equalization apparatus for compensating for phase and amplitude degradation of said first set of data pulses, said equalization apparatus including:
   a first quasi-adaptive equalizer receiving said first set of data pulses and adjusting the amplitude and phase of said first set of data pulses to produce a second set of data pulses;
   a second quasi-adaptive equalizer receiving said second set of data pulses and for adjusting the amplitude and phase of said second set of data pulses to produce an equalized set of data pulses;
   wherein both said quasi-adaptive equalizers adjust their compensation based on the amplitude levels of said data pulses and a compression based biasing scheme, wherein said first quasi-adaptive equalizer operates in a compression mode when it receives a data pulse having a first predetermined amplitude corresponding to a first predetermined length of said transmission medium, and said second quasi-adaptive equalizer operates in said compression mode when it receives a data pulse having a second predetermined amplitude corresponding to a second predetermined length of said transmission medium.

9. The decoder of claim 8, wherein said first equalizer has a first compensation network and said second equalizer has a second compensation network, wherein said compensation networks have reactive elements defining a frequency range over which said equalizers provide phase and amplitude compensation.

10. The decoder of claim 9
   (a) wherein said first equalizer further has a first differential amplifier coupled to said first compensation network, said first differential amplifier having a first differential input and a first differential output, said first differential input receiving said first set of data;
   (b) wherein said second equalizer further has a second differential amplifier coupled to said second compensation network, said second differential amplifier having a second differential input and a second differential output, said second differential input coupled to said first differential output to receive said second set of data, wherein said second equalizer produces said equalized set of data at said second differential output.

11. The decoder of claim 10,
   (a) wherein said first compensation network defines a first range over which said first equalizer provides phase and amplitude compensation and said second compensation network defines a second range over which said second equalizer provides phase and amplitude compensation;
   (b) wherein said equalization apparatus operates in a first compensation mode when said second equalizer is bypassed, operates in a second compensation mode when said second compensation network is bypassed, and operates in a third compensation mode when neither said second equalizer nor said second compensation network is bypassed.

12. The decoder of claim 11, wherein said quasi-adaptive analog equalization apparatus further comprises a first set of switches, a second set of switches, and a third set of switches,
   (a) said first set of switches creating a first bypass path that enables said equalization apparatus to operate in said first compensation mode by bypassing said second equalizer when said first set of switches are closed and said second and third set of switches are opened;

(b) said second set of switches creating a second bypass path that enables said equalization apparatus to operate in said second compensation mode by bypassing said second equalizer when said second and third set of switches are closed and said first set of switches are opened;

(c) wherein said equalization apparatus operates in said third compensation mode when said third set of switches are closed and said first and second set of switches are opened.

13. The decoder of claim 12 further comprising a switching control logic for controlling the operation of said sets of switches.

14. The decoder of claim 13, wherein said switching control logic is a single line tristate switching control logic.

15. The decoder of claim 13 further comprising a jitter detection circuit coupled to said quasi-adaptive equalization apparatus to receive said equalized data pulses, said jitter detection circuit determining the amount of correlated jitter in said equalized data pulses in order to direct said switching control logic to cause the equalization apparatus to operate in one of said compensation modes.

16. A quasi-adaptive analog equalization method for compensating for phase and amplitude degradation of a first set of data transmitted over a transmission medium, said method comprising the steps of:

(a) receiving said first set of data;

(b) performing a first quasi-adaptive equalization step of said first set of data by adjusting the phase and amplitude of said first set of data to produce a second set of data;

(c) performing a second quasi-adaptive equalization step on said second set of data by adjusting the phase and amplitude of said second set of data to produce an equalized set of data;

(d) wherein in both said quasi-adaptive equalization steps the amplitude levels of said sets of data and a compression based biasing scheme determine the amount of phase and amplitude adjustments that are provided.

(e) wherein, in said first quasi-adaptive equalization step, said compression based biasing scheme comprises a non-linear adjustment provided when a data pulse having a first predetermined amplitude corresponding to a first predetermined length of said transmission medium is received; and (f) wherein, in said second quasi-adaptive equalization step, said compression based biasing scheme comprises a non-linear adjustment provided when a data pulse having a second predetermined amplitude corresponding to a second predetermined length of said transmission medium is received.

* * * * *